(No Model.) 2 Sheets—Sheet 1.
A. GRIEVES.
EMERGENCY CAR BRAKE AND FENDER.
No. 588,824. Patented Aug. 24, 1897.
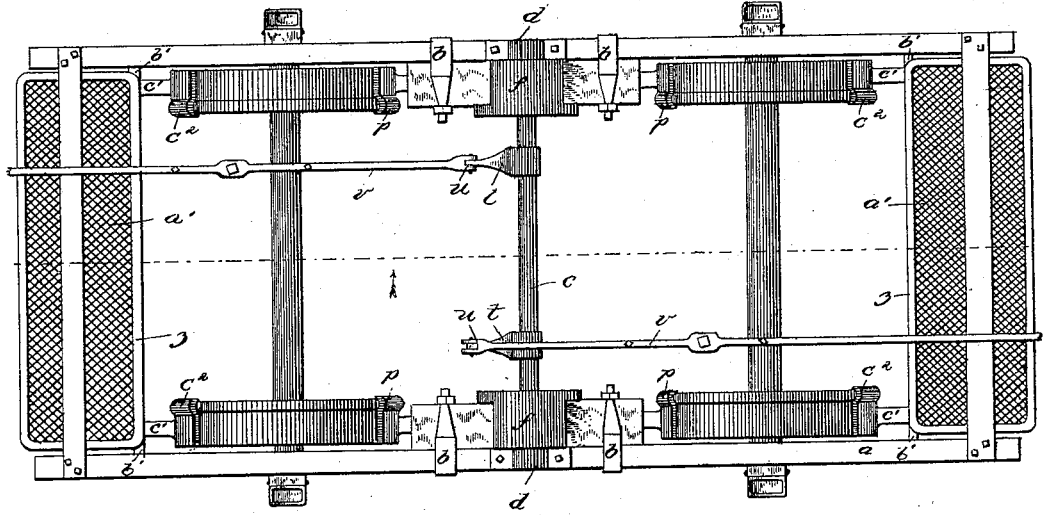
Fig. 1.
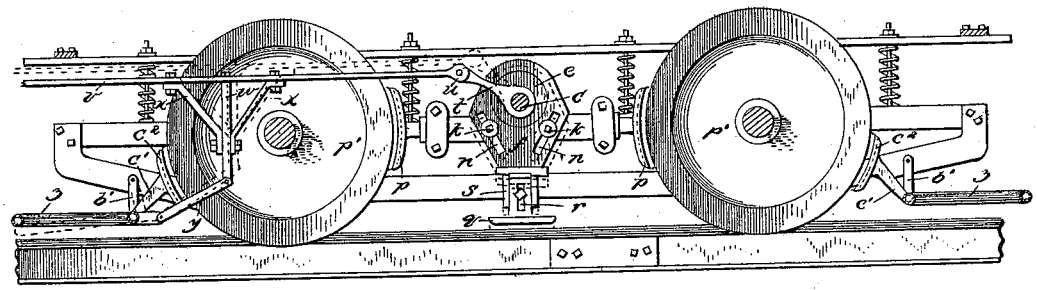
Fig. 2.
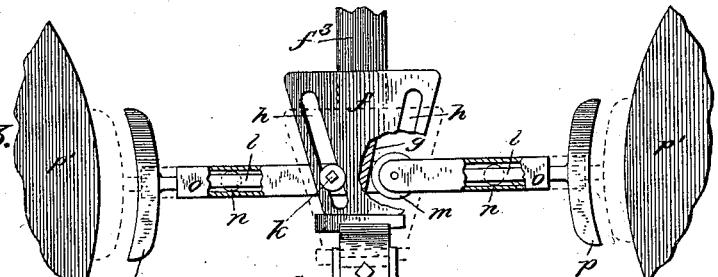
Fig. 3.
Witnesses
J. P. Appleman
A. M. Wilson
Inventor
Andrew Grieves.
By Henry C. Evert, Attorney
THE NORRIS PETERS CO., PHOTO-LITHO., WASHINGTON, D. C.

(No Model.) 2 Sheets—Sheet 2.
A. GRIEVES.
EMERGENCY CAR BRAKE AND FENDER.
No. 588,824. Patented Aug. 24, 1897.
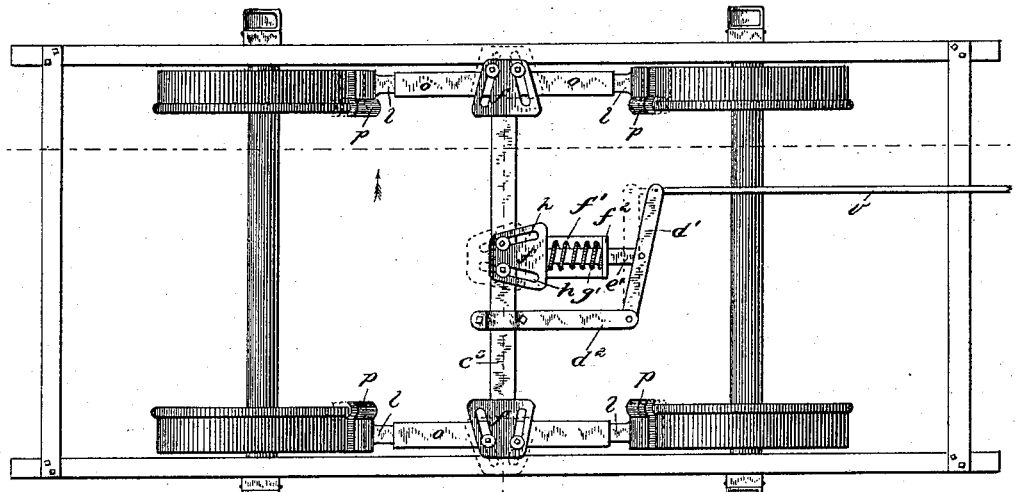
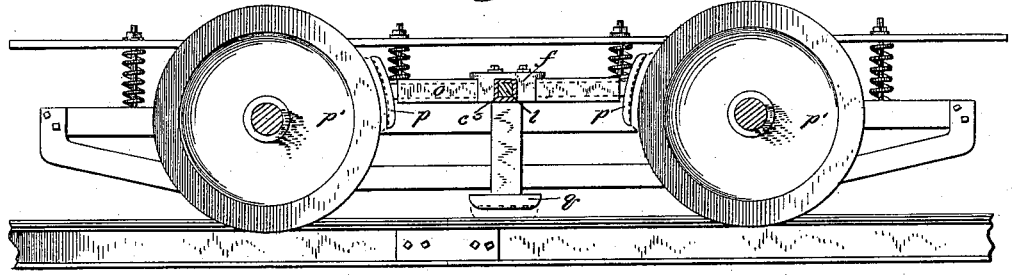
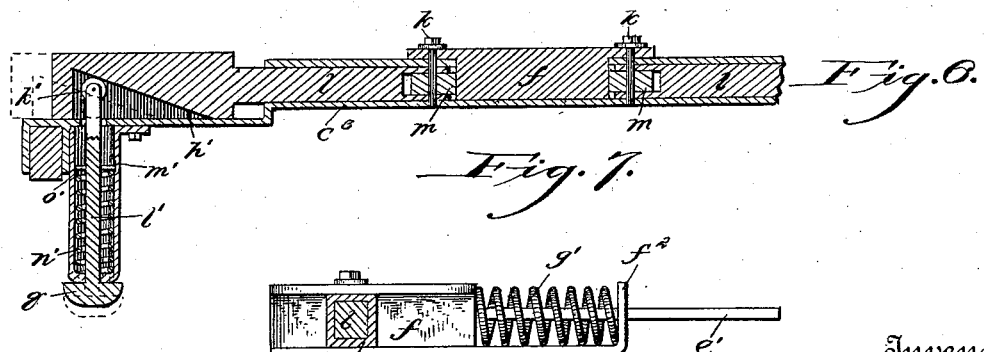
Witnesses
Inventor
Andrew Grieves.
By Henry C. Evert, Attorney

UNITED STATES PATENT OFFICE.

ANDREW GRIEVES, OF ALLEGHENY, PENNSYLVANIA.

EMERGENCY CAR BRAKE AND FENDER.

SPECIFICATION forming part of Letters Patent No. 588,824, dated August 24, 1897.

Application filed April 24, 1897. Serial No. 633,595. (No model.)

*To all whom it may concern:*

Be it known that I, ANDREW GRIEVES, a citizen of the United States of America, residing at Allegheny, in the county of Allegheny and State of Pennsylvania, have invented certain new and useful Improvements in Emergency Car Brakes and Fenders, of which the following is a specification, reference being had therein to the accompanying drawings.

This invention relates to certain new and useful improvements in combined car fenders and brakes, and has for its object to construct a brake which may be applied to both the wheels and the rail simultaneously with the operating of the brake, the fender will be lowered in such a position as to prevent any object from passing beneath the same, and when the brake is released the fender will be automatically raised to its normal position; and to this end the invention consists in the novel construction, combination, and arrangement of parts to be hereinafter more specifically described, and particularly pointed out in the claims.

The invention has for its further object to construct a combined brake and fender which may be operated with any desired lever mechanism, and may also be constructed so as to be operated by hand or other power, and, further, that may be easily arranged, so as to be applied to trailers of street-cars and the like.

In describing the invention in detail reference is had to the accompanying drawings, forming a part of this specification, and wherein like letters of reference indicate similar parts throughout the several views, in which—

Figure 1 is a top plan view of the car-truck, showing my improved car fender and brake in position. Fig. 2 is a longitudinal sectional view of the same. Fig. 3 is a side elevation, partly broken away, of a slightly-modified form of brake adapted to be used with air, steam, or other motive power. Fig. 4 is a top plan view of the brake arranged so as to be particularly adapted for trailer use. Fig. 5 is a longitudinal sectional view of Fig. 4. Fig. 6 is a cross-sectional view of a portion of this form of brake. Fig. 7 is a transverse sectional view of the same.

Referring now to the drawings by reference-letters, $a$ represents the truck-frame, which may be of any suitable construction and has supported therefrom between the wheels, by means of clips $b$, the brake mechanism, which consists of a shaft $c$, extending transversely of the truck and journaled on the frame in braces $d$, said shaft having secured thereon eccentrics $e$, which engage in the hangers $f$, which is provided with a wedge-shaped portion $g$ and with inclined slots $h\ h$, which are adapted to receive the bolts or pins $k$, carrying the brake-shoe hangers $l$, provided with wheels $m$, mounted upon the pins or bolts $k$ and adapted to engage the wedge $g$. These hangers are also provided with rollers or wheels $n$, which travel within the casing $o$ of the hanger, said wheels $m$ and $n$ serving to reduce the friction of the hanger within this casing and pin or wedge $g$, the hangers having on their outer ends the ordinary brake-shoes $p$. In the lower end of the plate or hanger $f$ is secured the brake-shoe $q$, which may be made adjustable by fastening thereto by a pin or bolt through a slot $r$ in the hanger $s$ on the brake-shoe.

On the shafts $c$ are secured the levers $t$, to which are pivotally attached the bifurcated ends $u$ of the pull-rods $v$, which are shown broken away, but are adapted to have their opposite ends attached to the operating-lever, which is arranged at any suitable point in the car and may be of any well-known construction for operating the device. To these pull-rods $v$ are connected rods $w$ and stiffening-braces $x$, the lower end of the rod $w$ having pivotally connected thereto an arm $y$, the opposite end of which is fulcrumed to the inner end of the fender-frame $z$, said fender-frame carrying a netting $a'$, composed of any suitable material. This fender has also fulcrumed thereto and to the frame $a$ an arm $b'$, and also formed integral with the rod or pin to which the arm $b'$ is fulcrumed is a brake-hanger $c'$, carrying a brake-shoe $c^2$. Thus it will be seen that as the lever in the car is operated it actuates the pull-rods $v$ and $t$ to operate the shaft $c$, which causes the eccentrics $e$ to engage the hanger $f$, and, as these eccentrics are turned, forces the hanger downward and causing the wedge portion $g$ of the same to engage on the rollers $m$, thus forcing the hangers $l$ outward and forcing the brake-shoes $p$ into engagement with the car-wheels $p'$. As the hanger $f$ descends the brake-shoe $q$ is consequently forced into engagement with the rail at the same time that the brake-shoes $p$ are forced into engagement with the wheels, and by reason of the movement given to the lever $t$ the rod $w$ and stiffening-brace $x$ have consequently moved from their original position, causing the rod $w$ to operate the fender $z$ and the brake-shoe $c^2$ through its connection by the arm $y$, which will lower the fender into close proximity to the track and force the brake-shoe $c^2$ into engagement with the wheel. When the operating-lever is released, the reverse motion will take place and the brakes will be released from their engagement with the wheels and rails and the fender returned through its connection with the operating-levers to the position shown in full lines.

Referring to Figs. 1, 2, and 3, the operation is as follows: To apply the brake and operate the fender, the pull-rod $v$ is forced backward, taking the left-hand portion of Fig. 1 as the front, which operates the lever $t$, turning the eccentric, which forces the brake-shoes against the wheels, also operating the track-brake. In the backward movement of the pull-rod $v$ the lever $t$ is forced upward, carrying the pull-rod with it, as shown in dotted lines in Fig. 2, and as the pull-rod is forced upward it carries the rod $w$ in an upward direction and through the rod $y$ pulls the front brake-shoe against the wheel, and as the fender is fulcrumed to the arm $b'$ the back portion of the fender is elevated and the front part is lowered nearer to the track.

In Figs. 4, 5, 6, and 7, I have shown how the same principle may be applied, this construction being particularly adapted for trailers for street-cars and the like, the pull-rod $v$ being pivotally attached and an arm $d'$ having its opposite end likewise secured to the arm $d^2$, which is rigidly secured on the casing $c^3$, said arm $d'$ being fulcrumed to an arm $e'$, which is attached to the hanger $f$, said hanger being provided in this construction with an extending plate $f'$, through which the arm $e'$ extends, and has arranged thereon, between the upturned end $f^2$ of the plate and the plate $f$, a coil-spring $g'$, which serves to release the brakes when the lever in the car is released. The brake-shoe hangers $l$ in this construction engage in the casing $c^3$ and are provided on their underneath face with a cut-away portion, forming an incline $h'$, which is adapted to engage the rollers or wheel $k'$ secured in the upper end of the vertical hanger $l'$, operating in the casing $m'$, supported from the casing $o$, and has arranged thereon a coil-spring $n'$, which is depressed, when the brake-shoe is operated, by means of the washer $o'$, secured on the hanger $l'$ and adapted to release the shoe when the brake-lever is released. Thus it will be observed that as the pull-rod $v$ is operated it actuates the arms $d'$ and $e'$ to operate the plate $f$ and force the wedge portion $g$ of the plates into engagement with the rollers $m$ to force the brake-hangers $l$ downward and the brake-shoes $p$ into engagement with the wheels and at the same time cause the inclined face $h'$ to ride on the roller $k'$, forcing the brake-hanger $l'$ downward and the brake-shoe $q$ into engagement with the rails. The fender may also be operated by this mechanism as well as by the other, though it will hardly be necessary when this device is used for trailers.

In Fig. 3 I have shown the hanger $f$ as provided with an arm or lever $f^3$ when the brake is used in this manner.

It will be noted that various changes may be made in the details of construction without departing from the general spirit of my invention.

Having fully described my invention, what I claim as new, and desire to secure by Letters Patent, is—

1. In a combination brake and fender, a shaft journaled in the truck-frame, eccentrics secured on said shaft, hangers engaging said eccentrics and adapted to be operated thereby, said hangers being formed with a wedge portion which engages brake-shoe hangers to force the brake-shoes into engagement with the wheels, and a brake-shoe carried by said hangers to engage the rail, lever connections with said shaft, and connections with said levers whereby the fender is operated simultaneously with the applying of the brakes, substantially as shown and described.

2. In a combination brake and fender, a shaft journaled in the truck-frame, eccentrics arranged on said shaft, hangers engaging said eccentrics, brake-shoes suitably supported, and adapted to be operated through the eccentrics engaging the hangers, lever connections with said shaft, and a fender having connections with the lever, whereby the same is operated when the brake is applied, substantially as shown and described.

3. In a combination brake and fender, an operating-shaft, and lever connections therewith, a fender carrying a brake-shoe and having connections with the levers operating the shaft, hangers engaging eccentrics on the shaft, said hangers carrying a brake-shoe adapted to engage the rail, a casing connected to said hangers, brake-shoe hangers operating in said casing, and adapted to be forced outwardly through the downward movement of the hanger, substantially as shown and described.

4. In a combination brake and fender, a shaft journaled in the truck-frame, hangers eccentrically mounted upon said shaft, brake-shoes adapted to be forced into engagement with the wheels and the rail through the downward movement of the hangers, lever connections with the operating-shaft, a fender and brake-shoe, and connections between said fender, brake-shoe and lever connections whereby the same are simultaneously operated, substantially as shown and described.

5. In a combination brake and fender, an operating-shaft, lever connections therewith, and a fender and brake-shoe adapted to be operated through said lever connections, hangers eccentrically mounted upon the operating-shaft and adapted to apply the brake-shoes to the wheels and rails by the downward movement of the hangers, substantially as shown and described.

In testimony whereof I affix my signature in presence of two witnesses.

ANDREW GRIEVES.

Witnesses:
  JOHN NOLAND,
  THOS. M. BOYD, Jr.